INVENTOR
JAMES E. SCHOLL
BY
ATTORNEY

United States Patent Office 3,386,691
Patented June 4, 1968

3,386,691
CONSTANT RUNOUT BRIDLE ARRESTER
James E. Scholl, Fairfax, Va., assignor to the United States of America as represented by the Secretary of the Navy
Filed Aug. 1, 1966, Ser. No. 569,524
6 Claims. (Cl. 244—110)

ABSTRACT OF THE DISCLOSURE

This invention is a system for arresting the bridles, which are used to connect aircraft to be launched to the catapult shuttles on the deck of an aircraft carrier, when the launch has been completed. The invention comprises an elongated metal strap having one end connected to the bridle and the other end wound on a drum which is fixed to a shaft rotatably mounted on the aircraft carrier. A brake disc is also fixed to the shaft and is provided with a pair of hydraulic brakes adapted to grip the brake disc and retard rotation of the shaft. A hydraulic system, including a pump coupled to and driven by the shaft, is provided for supplying hydraulic fluid under pressure to the brakes upon rotation of the shaft caused by strap runout during launch of an aircraft. The hydraulic system also contains a variable orifice valve located in a by-pass line so that when the valve is opened, the hydraulic fluid from the pump by-passes the brakes. A cam mechanism, driven by rotation of the shaft, operates the variable orifice valve. The cam is so configured that (1) the valve is fully open and renders the brakes substantially ineffective during an initial portion of the acceleration of the aircraft and bridle, (2) the valve is partially closed to render the brakes partially effective to apply a secondary braking force during the terminal portion of acceleration of the aircraft and bridle and (3) the valve is fully closed upon separation of the aircraft and bridle to render the brakes fully effective to apply a primary braking force which will decelerate and stop the bridle at a fixed point.

---

The invention described herein may be manufactured and used by or for the Government of the United States of America for governmental purposes without the payment of any royalties thereon or therefor.

The present invention relates to a system for arresting bridles or auxiliary equipment used in conjunction with launching systems for launching aircraft from the decks of aircraft carriers. More particularly, the present invention relates to a control system for a bridle arresting device.

It is conventional to have an arresting system cooperate with a catapult launching system for launching aircraft in order to arrest any auxiliary equipment, such as launching bridles, that is employed in conjunction with launching the aircraft. In operation, a brake system in the arresting device is continuously adjusted in order to take into account variables such as the speed and weight of the bridle being arrested. Such continual adjustments increase the likelihood of operator error and thus increase the likelihood of damage to the brake system, loss of the auxiliary equipment and possible damage to the launched aircraft. A control system which would automatically compensate for such variables would eliminate many of these problems.

Accordingly, it is an object of the present invention to provide an automatic control system for a hydraulic braking device.

Another object of the present invention is to provide a control means for a bridle arresting system.

A further object of the present invention is to provide a control system for a hydraulic braking device which is actuated in response to the speed and location of the object being halted.

Still another object of the present invention is to provide a control device for a hydraulic braking system which increases the brake pressure in proportion to the speed and position of a moving object which is to be halted.

Yet another object of the present invention is the provision of a bridle arresting system wherein there is eliminated the need for adjusting the system for different types of bridles.

A still further object of the present invention is to provide an automatic control system in a bridle arresting mechanism which will adjust the brake pressure of a hydraulic brake system in proportion to the speed and position of the bridle which is to be arrested.

Figure 1:
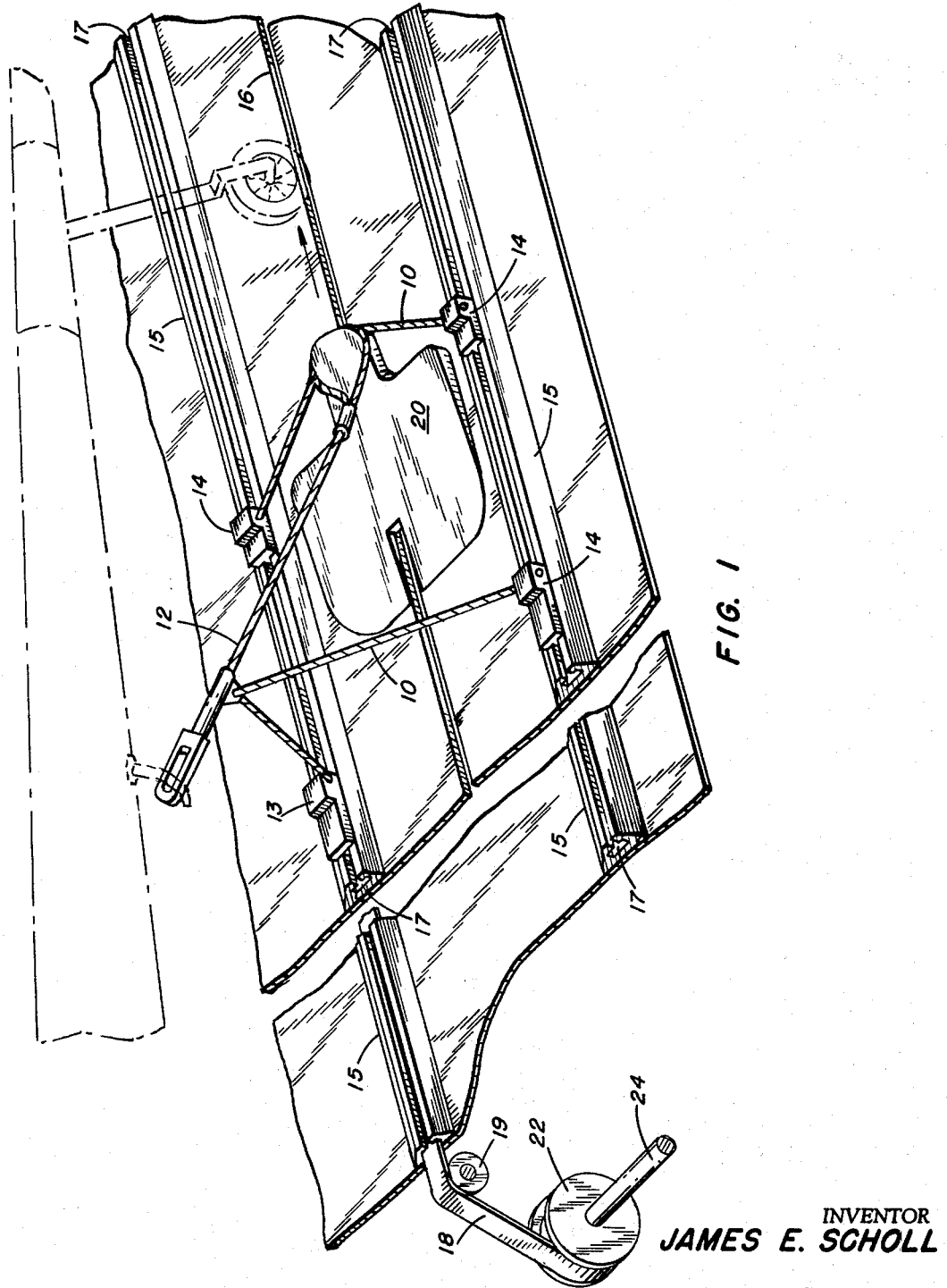
Figure 2:
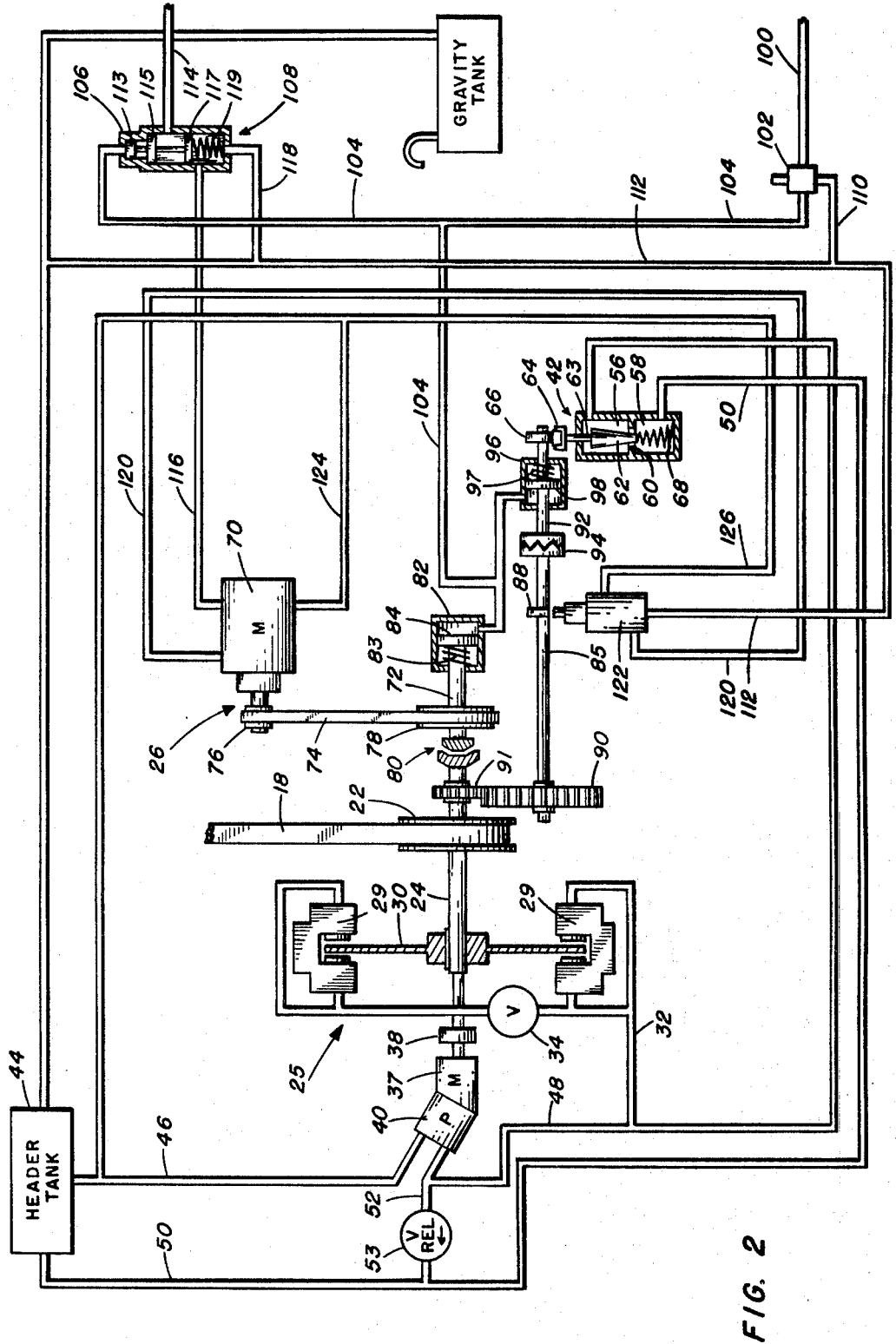

Other objects, advantages and novel features of the present invention will become apparent from the following detailed description of the invention when considered in conjunction with the accompanying drawings wherein:

FIG. 1 is a perspective view of the above-deck components of the bridle arresting system with parts broken away showing a portion of the below-deck components; and FIG. 2 is a schematic view of the below-deck components of the bridle arresting system.

Referring now to the drawings, there is illustrated a bridle arresting system which would be, for example, employed in conjunction with a catapult system on an aircraft carrier. Lanyards 10 (FIG. 1) are attached to the bridle 12 and connect shuttle 20 with sliders 14. A track system consisting of tracks 15 are mounted on the deck substantially parallel to the center line of the catapult shuttle slot 16. The track system is a guide for the shuttle, sliders and arresting strap 18. The arresting strap acts as a connecting means which connects the object to be arrested with strap drum 22. The arresting strap extends in guide slot 17 formed in one of the tracks 15 over idler drum 19 and is wrapped around the strap drum 22 which is splined onto main shaft 24. The main shaft, strap drum and attached brake disc 30 (FIG. 2) acts as a drive means for driving motor 37 and pump 40. During the launching of an aircraft, the bridle and the attached arresting equipment are propelled along the deck by the catapult shuttle 20 so that arresting strap 18 is unwound from the strap drum, thereby imparting rotation to the main shaft. A hydraulic brake system 25 is provided for halting the rotation of the main shaft at the end of the catapult launch stroke and a hydraulic retraction system 26 is provided for rewinding the strap on drum 22.

The hydraulic brake system consists of two identical hydraulic brakes 29 acting upon a brake disc 30 which is non-rotatably attached to main shaft 24. Hydraulic fluid is conducted through brake conduit 32 to each of the brakes. A low energy cut-out valve 34 is located in brake conduit 32 between each of the brakes whereby the cut-out valve may be closed when low catapult end speeds are required to thereby allow only one-half of the brake system to be energized.

The control system for the hydraulic brake system includes a motor 37 driven by the main shaft 24 via an over-running clutch 38, a pump 40 actuated by motor 37 and a cam actuated variable orifice valve 42. Low pressure fluid is supplied from header tank 44 to the pump by conduit 46 and the high pressure outflow from the pump is conducted via conduit 48 to one side of variable orifice valve 42 and via conduits 48 and 32 to the hydraulic brakes 29. The output of pump 40 is directly dependent upon the speed of rotation of main shaft 24 so that the greater the speed of rotation the larger the amount of fluid pumped.

A return conduit 50 extends from the other side of the variable orifice valve back to the header tank. A conduit 52 having a relief valve 53 therein extends between the high pressure conduit 48 and the return conduit 50. The variable orifice valve comprises an input chamber 56 and output chamber 58 separated by a partition defining an orifice 60 therebetween. A tapered needle valve stem 62 and a guide shaft 63 attached to one end of the valve stem are slidably mounted within valve chamber 56 with a portion of the guide shaft extending through the valve housing to the outside and with the valve stem adapted to slide into and out of orifice 60 to thereby vary the effective area of the orifice. A roller follower 64 is attached to the end of the guide shaft extending outside the valve housing and is adapted to bear against a brake cam 66. The roller follower is held in contact with cam 66 by a valve spring 68 mounted within valve chamber 58 and which acts on the lower portion of the valve stem. The brake cam is connected into the arresting system so as to make slightly less than one complete revolution for each catapult launch stroke, as will hereinatfer be described, and is designed such that the cam will adjust the effective area of the orifice in relation to the position of the bridle during the launch stroke. The cam is specifically shaped to keep the orifice wide open until a secondary braking point is reached, after approximately 90 feet of the catapult stroke, at which point the valve is partially closed to thereby apply a small secondary brake pressure to brakes 29 in order to maintain the arrester strap taut and to prevent the strap from unwrapping from drum 22. A dwell in the cam will maintain this orifice size until the point of primary braking is reached at the end of the catapult stroke. During this dwell the increase in velocity of the catapult will increase the speed and, hence, the flow output of the pump and the brake pressure is thereby proportionally increased. Thus, the velocity increases during launch and the attendant increase of centrifugal force tending to throw the strap off the drum is automatically compensated for by an increase in the brake pressure. When the primary braking point is reached, the cam is shaped so as to give a substantially constant braking pressure during arrestment. Thus, the variable orifice valve in combination with pump 40 provide means for applying a brake pressure which is dependent upon both the speed and position of the bridle during the catapult stroke.

The retraction system 26 includes a retraction motor 70 which drives auxiliary shaft 72 in a counter-clockwise direction by means of an endless chain 74 and associated sprockets 76, 78. A clutch, illustrated at 80, interconnects the main shaft and the auxiliary shaft. A hydraulic actuating clutch cylinder 82 and an associated piston 84 attached to cam shaft 72 acts when pressurized to engage clutch 80 to thereby effectively join both main and auxiliary shaft. A first cam shaft 85 having cam 88 keyed thereon is driven via gears 90, 91 such that cam shaft 85 will make slightly less than one revolution for every arrestment. A second cam shaft 92 having brake cam 66 keyed thereon is driven by first cam shaft 85 through clutch means 94. A hydraulic cylinder 96 and an associated piston 98 attached to cam shaft 92 acts when pressurized to disengage the clutch 94. Spring means 83 acts within hydraulic cylinder 82 in order to disengage clutch 80 and allow auxiliary shaft 72 to normally be disengaged from the main shaft when hydraulic cylinder 82 is not pressurized. Likewise, a similar spring means 97 is mounted within cylinder 96 in order to normally engage clutch 94 such that shaft 92 is driven by shaft 85 when hydraulic cylinder 96 is not pressurized. A conduit 100 extends from a high pressure input source to one side of a three-way solenoid actuated valve 102. Conduit 104 extends from the valve 102 to hydraulic cylinders 82, 96 and to a pilot valve 106 which is part of a three-way operating valve 108. A third conduit 110 extends from the three-way valve 102 to a conduit 112 extending back to header tank 44. Operating valve 108 has a valve stem having three spaced lands 113, 115, 117, which stem is normally held in the position shown by spring 119. The operating valve is actuated by the high pressure fluid in conduit 104 acting upon small land 113. In addition to conduit 104 extending into the operating valve 106, there is an inlet conduit 114 extending into the valve from a bridle tensioning system, not shown, an exhaust conduit 116 extending from the valve to the fluid operated retraction rotor 70 and a vent conduit 118 connecting the valve with conduit 112. When solenoid valve 102 is actuated so as to connect conduit 100 with conduit 104, the resulting fluid under pressure in conduit 104 simultaneously acts in hydraulic cylinders 82, 96 and in pilot valve 106 to thus cause clutch 80 to engage, clutch 94 to disengage and conduit 114 to be connected with conduit 116. The fluid under pressure in conduit 114 drives the hydraulic retraction motor 70 and is returned through conduit 120 to a cam actuated de-acceleration valve 122 which operates in similar manner to variable orifice valve 42. The output from the de-acceleration valve extends via conduit 112 back to the header tank. Vent lines 124 and 126 also extend from the motor 70 and de-acceleration valve 122, respectively, to the header tank.

In operation, the lanyards 10 are attached to a bridle 12 which connects an aircraft to be launched with the catapult driven shuttle 20. The lanyards are then tensioned by energizing a control relay, not shown, which actuates solenoid valve 102. The actuation of the solenoid valve connects conduit 100 with conduit 104 and allows fluid under high pressure to act in hydraulic cylinders 82, 96 and in pilot valve 106, to thereby engage retract clutch 80, disengage clutch 94 and opening operating valve 108, respectively. With valve 108 open high pressure from conduit 114 acts via conduit 116 to drive the retraction motor 70. The strap rewinds slowly and removes any slack from the lanyards. When the control relay is de-energized, the solenoid valve 102 is closed such that clutch 80 will be disengaged and clutch 94 will be engaged. The bridle arresting system is thus tensioned and ready for launch.

When an aircraft is launched, the bridle arrester shuttle 13 is towed by lanyards 10 attached to the bridle. During the catapult power stroke, the strap unwinds and drives both pump 40 and brake cam 66. After the bridle has been towed approximately 90 feet during the catapult power stroke, the brake cam slightly closes the variable orifice valve and causes hydraulic back pressure in line 48 to actuate a secondary braking force. This brake force puts a drag load on the main shaft which prevents the arrester strap from unwrapping from the drum. At the end of the catapult power stroke a constant primary braking force is applied by the gradual closing of the variable orifice valve. At the stopping point the area of the variable orifice will be very nearly zero.

In retracting the bridle arrester strap the hydraulic and electrical functions are exactly the same during the tensioning phase. The retract speed is controlled through the cam operated de-acceleration valve 122. As retraction starts, valve 122 is wide open. During the return stroke the retract cam rotates and gradually closes the de-acceleration valve and slows the flow of fluid through the motor and thus retarding the speed of the motor. The over-running clutch 38 allows the pump to remain stationary during the return cycle. In launching an aircraft requiring only a low catapult end speed, the cut-out valve 34 is closed in order to shut off half the brake system. Operational sequence remains the same except that the brake pressure is applied to only two of the four brake cylinders.

It will thus be apparent that there is provided a bridle arresting system wherein the cooperation between a hydraulic pump and a variable orifice valve determines the hydraulic pressure that is applied to a hydraulic brake system 25. There is thus provided a control system for a braking device which adjusts the braking force in proportion to the speed and position of the object being arrested.

Obviously many modification and variations of the present invention are possible in light of the above teachings. It is therefore to be understood that within the scope of the appended claims the invention may be practiced otherwise than as specifically described.

What is claimed is:

1. A system for arresting a moving object that has been accelerated from rest comprising:
   a drive means;
   a connecting means coupling the moving object to said drive means and adapted to utilize the motion of the moving object to actuate said drive means;
   a brake system for applying a braking force to said drive means; and
   a brake control means operatively connected to said brake system and said drive means for controlling the braking force applied to said drive means; said brake control means being actuated by said drive means and having means operative to render said brake system ineffective during an initial portion of the acceleration of the moving object, to render said brake system partially effective during the terminal portion of the acceleration of the moving object, and to render said brake system fully effective to decelerate and stop the moving object upon completion of the acceleration thereof.

2. A system of the character set forth in claim 1 further characterized by a flow conducting means operatively interposed between said brake control means and said brake system for supplying fluid to said brake system, said brake control means including a pump means operatively coupled to both said flow conducting means and said drive means, whereby the output of said pump means is in proportion to the speed of said drive means.

3. A system of the character set forth in claim 1 wherein said brake control system comprises a hydraulic pump means, a variable orifice valve means and a conduit means operatively interposed between said pump means and said valve means, said pump means and said valve means being actuated by said drive means, said brake system being actuated by the fluid under pressure in said conduit means, said pump means and said valve means cooperating to pressurize said brake system in proportion to the speed and position of the object being arrested.

4. A system of the character set forth in claim 3 wherein said drive means includes a main shaft, a brake disc and a drum coupled to said shaft, said connecting means having an arrester strap which is adapted to be wound around said drum such that during the arrestment of the moving object said strap will be unwound from said drum to thereby rotate both said drum and said shaft.

5. A system as set forth in claim 3 for use with a launching system for launching an aircraft from a carrier deck, said launching system having power driven shuttle means movable in a fixed path and predetermined direction along said deck, bridle means for detachably connecting said power driven shuttle means to an aircraft to be launched, said bridle means becoming detached from both said power driven shuttle means and the aircraft after the launch of the aircraft, lanyard means connecting said bridle means to said connecting means, said connecting means being movable in a fixed path parallel to the path of said power driven shuttle means, said drive means comprising a rotatable main shaft, a brake disc and a drum attached to said shaft, said shaft being coupled to said brake control means, said connecting means including an arresting shuttle slidable along the fixed path and an arresting strap attached to both said arresting shuttle and said drum, said arresting strap being adapted to be wrapped around said drum such that during the launching of the aircraft said arresting strap will unwind from said drum in order to rotate said shaft and thereby actuate said brake control means.

6. A system as set forth in claim 5 further characterized by a retraction means for rewinding said arresting strap in preparation for another arrestment, said retraction means being selectively engageable with said drive means.

References Cited

UNITED STATES PATENTS

| | | | |
|---|---|---|---|
| 3,142,458 | 7/1964 | Byrne et al. | 244—63 |
| 3,145,952 | 8/1964 | Ambrosano | 244—63 |
| 3,161,380 | 12/1964 | Crines | 244—63 |
| 3,311,329 | 3/1967 | Lakitsky | 244—63 XR |

FERGUS S. MIDDLETON, *Primary Examiner.*

P. E. SAUBERER, *Assistant Examiner.*